United States Patent
Bawa

(10) Patent No.: US 11,540,978 B2
(45) Date of Patent: Jan. 3, 2023

(54) DUAL-SIDED CLEANING PACIFIER AND METHOD OF USE

(71) Applicant: Anoop Sufi Bawa, Gainesville, VA (US)

(72) Inventor: Anoop Sufi Bawa, Gainesville, VA (US)

(*) Notice: Subject to any disclaimer, the term of this patent is extended or adjusted under 35 U.S.C. 154(b) by 0 days.

(21) Appl. No.: 17/163,488

(22) Filed: Jan. 31, 2021

(65) Prior Publication Data
US 2022/0241157 A1    Aug. 4, 2022

(51) Int. Cl.
*A61J 17/00* (2006.01)

(52) U.S. Cl.
CPC .......... *A61J 17/105* (2020.05); *A61J 17/107* (2020.05)

(58) Field of Classification Search
CPC .......... A61J 17/00; A61J 17/001; A61J 17/02; A61J 17/105; A61J 17/107; A46B 9/005; A46B 9/02; A46B 9/026; A46B 9/028; A46B 2200/1066; A46B 15/0055; A61H 13/00
See application file for complete search history.

(56) References Cited

U.S. PATENT DOCUMENTS

| | | | | |
|---|---|---|---|---|
| 5,615,443 A | * | 4/1997 | Lai | A46B 9/045 15/176.1 |
| 10,555,876 B1 | * | 2/2020 | Samandari | A46B 1/00 |
| 2009/0306712 A1 | * | 12/2009 | Rohrig | A61J 17/107 606/236 |
| 2017/0151131 A1 | * | 6/2017 | Bawa | A46B 15/0055 |
| 2021/0121371 A1 | * | 4/2021 | Samandari | A61J 17/105 |

FOREIGN PATENT DOCUMENTS

KR     20140141944 A  *  12/2014

* cited by examiner

*Primary Examiner* — Diane D Yabut
(74) *Attorney, Agent, or Firm* — Jonathan Brown

(57) ABSTRACT

A dual-sided pacifying gum and teeth cleaning device. The pacifying cleaning device is comprised of a U-shaped cleansing portion proceeding in a circular manner between the base of a nipple and a raised lip displacer. The cleansing portion has a pair of walls with sets of bristles, such that the respective sets of bristles generally face each other. As an infant sucks on the pacifying device, the position of the bristles and sucking action result in frictional contact against both the front and back of the infant's teeth, providing improved overall cleaning of teeth and gums.

20 Claims, 3 Drawing Sheets

DUAL-SIDED CLEANING PACIFIER AND METHOD OF USE

TECHNICAL FIELD OF THE INVENTION

The present invention relates to the general field of oral health, more specifically, to pediatric health, and even more specifically, to the field of oral health pacifiers.

BACKGROUND OF THE INVENTION

It is important to keep the teeth of infants and young children cleaned and free of infection, yet this has recently become more challenging. One continuing problem is an infection known by several names, including "Baby Bottle Caries," early childhood caries and bottle rot. It is a disease derived from a bacterial infection that results in decay in the teeth of infants and younger children. Baby Bottle Caries has greatly increased in the US to an epidemic level. In some populations and areas of the country, particularly in rural and minority populations, as many as 70% of children are infected. In addition to infections, cavities have become more and more prevalent because of the greater availability of foods containing processed sugars. Cavities, if left untreated, can lead to infection, rot, and possible loss of individual teeth and even parts of the gums underlying the teeth.

The incidence of problems such as cavities, Baby Bottle Caries and other dental issues can be greatly reduced by regular teeth cleaning and removal of the bacteria. In addition, it is generally important, for good dental hygiene, that infant teeth be periodically cleaned. However, obtaining regular cleanings can be difficult. Many do not have the funds or ability to schedule cleanings for their infant or young child. Often, even regular dental care and visits go neglected until there is an unavoidable problem or great pain. Furthermore, getting infants and young children to keep from moving around while having their teeth cleaned can add a layer of difficulty to the cleanings themselves. Some infants and children can have such a hard time staying still, due to anxiety or excess energy, that cleaning their teeth without anesthesia can be nearly or completely impossible.

Regular brushing or other process of home cleansing of teeth can not only be helpful, but critical. Cleaning is periodic, whereas brushing or other home cleansing can (and should be) daily. It is important, when either getting teeth either periodically cleaned or daily that the upper and lower teeth both be cleaned or brushed, as well as the inner-facing and outer-facing portions of teeth. Simply cleansing one side, or one part, of teeth is clearly insufficient, as this leaves much surface still as vulnerable to the problems above.

However, achieving this kind of coverage, by brushing or other cleansing method, of the teeth of infants or children can be very difficult. First, as in the case with periodic cleanings, there is the discussed, and still present, problem of getting infants or children to stay still long enough for the process. Doing so periodically is difficult; doing so daily is that much more difficult. A second issue is that the mouths of infants and children tend to be smaller, making reaching front and back, as well as top and bottom, surfaces effectively more difficult than with an adult-sized mouth.

Solutions to reach these multiple surfaces are not very satisfactory. People often use or try to adapt some kind of toothbrush, but these often do not reach the various surfaces, particularly with an infant or child moving about. Sometimes a caregiver will use a baby wipe, cloth, or similar item, but these are likely even less effective than brushing. Some adults may try to use their finger, but as a finger is wider than a brush, it is also likely to be less effective at reaching surfaces. In addition, there is the possibility that the child may bite down, causing injury.

Therefore, there is a need for a pediatric oral cleaning product to help keep the teeth of infants and toddlers clean, and capable of providing cleansing of teeth surfaces, including upper and lower teeth, and in both the front and back areas of teeth.

SUMMARY

A dual-sided pacifying gum and teeth cleaning device (i.e. "pacifying cleaning device") is disclosed. The pacifying cleaning device is comprised, generally, of the following:

- a pacifying stem, comprised of an elongated and rounded nipple portion attached to a guard portion,
- a U-shaped cleansing portion proceeding in a circular manner between the base of the nipple portion and a lip displacer,
- a raised lip displacer located atop the guard portion and about the base of the nipple portion, and
- a guard handle attached to the guard portion on the other side of the pacifying device in relation to the nipple portion.

The nipple portion of the pacifying device is inserted by a caregiver, possibly by the handle or ring, into the mouth of an infant or young child. As the infant sucks on the pacifying device, the infant's mouth is pressed against the lip displacer. The protuberance of the lip displacer, accompanied by a generally rounded shape, act to gently push the infant's lips apart. The separation of the lips is continued and reinforced by the infant's sucking action on the nipple, which also helps pacify the infant.

The cleansing portion is part of the pacifying stem, and along it, between the nipple and lip displacer, and is further located at or near the base of the nipple. The U-shaped cleansing portion has a generally lower profile than either the nipple or lip displacer. This results in a generally U-shaped configuration and generally inward orientation of the U-shaped cleansing portion relative to the surface of the nipple.

The lower profile of the cleansing portion relative to the nipple and lip displacer results in a generally U-shaped canyon that goes completely, or at least partially, around the stem. The U-shaped canyon is comprised of a floor comprised of the surface of the cleansing portion, a first wall or shelf (i.e. "wall"), and a second wall or shelf (i.e. "wall") or shelf, directly facing the first wall, with the two walls separated by the cleansing portion. The two walls proceed partially or completely around the stem in a generally circular orientation.

A first set of teeth gum and teeth cleaning apparatus is located along the surface of the first wall, and a second set gum and teeth cleaning apparatus is along the second wall, such that the respective sets of teeth cleaning apparatus generally face each other. The teeth cleaning apparatus can be comprised of any suitable in the art for this purpose, including, but not limited to, bristles, or other protuberances, a set of thin shafts, soft nubs, or a set of rounded surfaces.

The walls and teeth cleaning apparatus sets are in a generally perpendicular orientation to the surface of the cleansing portion. The cross section of the cleansing portion itself can be any suitable shape such as circular, ovoid, rectangular, or other suitable shape.

As the infant continues sucking on the nipple and the infant's lips become separated by the lip displacer, the infant's teeth naturally gravitate forward along the nipple towards the cleansing portion located at or near the base of the nipple. As the infant's mouth reaches the lip displacer and guard, any forward motion will stop, and the infant's teeth will drop onto the cleansing portion.

In a preferred embodiment, bristles are used and described. Because of the lip separation of the lip displacer, bristles can work their way past the lips and into the infant's mouth, between and adjacent to the infant's teeth and against the infant's gums, or if the infant has no teeth, then simply against the gums. As the baby sucks and moves his/her mouth around, the respective bristle sets will frictionally contact against the baby's teeth, thereby helping remove debris or substances from the teeth, providing a cleaning motion and action. The action of the bristle sets moving against the teeth and gums, brought about by the sucking motions of the infant, serve to clean the teeth and gums, removing contaminants that can help cause infection.

Because the bristle sets are at least at the top and bottom of the stem, or in one embodiment, all the way around in a generally circular pattern, the upper and lower teeth are both in contact with the bristles. Further, because of the orientation and placement of the bristles, they are in frictional mechanical contact with both the front and back of the infant's teeth. The infant engages the pacifier with upper teeth on the top aspect of the pacifier into the notch formed by the cleansing portion and bristle sets and respective walls that hold the bristle sets, and the lower (i.e. "bottom") teeth engage the bottom aspect of the pacifier on the other side of the notch relative to the top aspect.

The lip displacer shape can be any suitable shape to complete its function, such as, but not limited to, oblong, circular, loosely rounded hourglass or butterfly wing configuration. In one embodiment, the shape of the lip displacer is a generally oblong shape.

The pacifying cleaning device is comprised of a number of safety features. One feature is a guard handle that serves primarily as a safety feature to enable a caregiver to quickly remove the pacifying device if necessary.

Another safety feature of the pacifying device are one or more apertures. The aperture sets are present about the guard and through the guard. The aperture sets are each comprised of one or more apertures of suitable size, number, and location about the guard, such that an infant can continue to breathe in case the pacifying device somehow becomes stuck or lodged.

In one embodiment, the pacifying device is a single-piece construction of latex, rubber, silicone, or flexible plastic. The pacifying device can, however, be of a multi-piece construction, with the pieces attached by any acceptable and safe means known in the art.

In one embodiment, the guard is generally oblong. However, the guard can be any suitable shape that allows it to perform its function of resting against the outside of the infant's mouth and preventing ingestion, such as, e.g., a more rounded shape, a more rectangular shape with rounded corners, or a shape with protrusions, such as a shape resembling a clover or butterfly or heart.

The guard handle is round in one embodiment, but can be any suitable shape, such as a multi-sided configuration. The nipple is elongated and generally rounded at its outer end. It can also be of any suitable configuration for its purpose: providing an infant with a protuberance to suck upon.

The teeth cleaning apparatus can be made of any suitable material and of any suitable configuration known in the art for generating an effective cleaning action for infant teeth and/or gums. The teeth cleaning apparatus can be comprised of, for example, but not limited to, silicon, rubber, rubberized, nylon, another type of plastic, or other resin material. In this embodiment, the bristles are comprised of silicon protuberances known in the teeth-cleaning art. The bristle sets can further be comprised of soft or extra soft bristles. In other embodiments, the nubs or protuberances can be comprised of soft triangular nubs suitable for movement between teeth, or nubs of other suitable size, type, and configuration, and also comprised of, for example, any of the materials previously disclosed for the bristles.

Provided herein is a pacifier type delivery system wherein an infant's/toddler's teeth engage the device in a specific area that allows their teeth (both upper and lower) in the space that has the bristle sets for targeted cleaning.

DETAILED DESCRIPTION OF PREFERRED EMBODIMENTS

Other objects, features, and advantages of the invention will become apparent from a consideration of the following detailed description and the accompanying drawings. The following descriptions are made referring to the figures, wherein like reference number refer to like features throughout this description.

Figure 1:
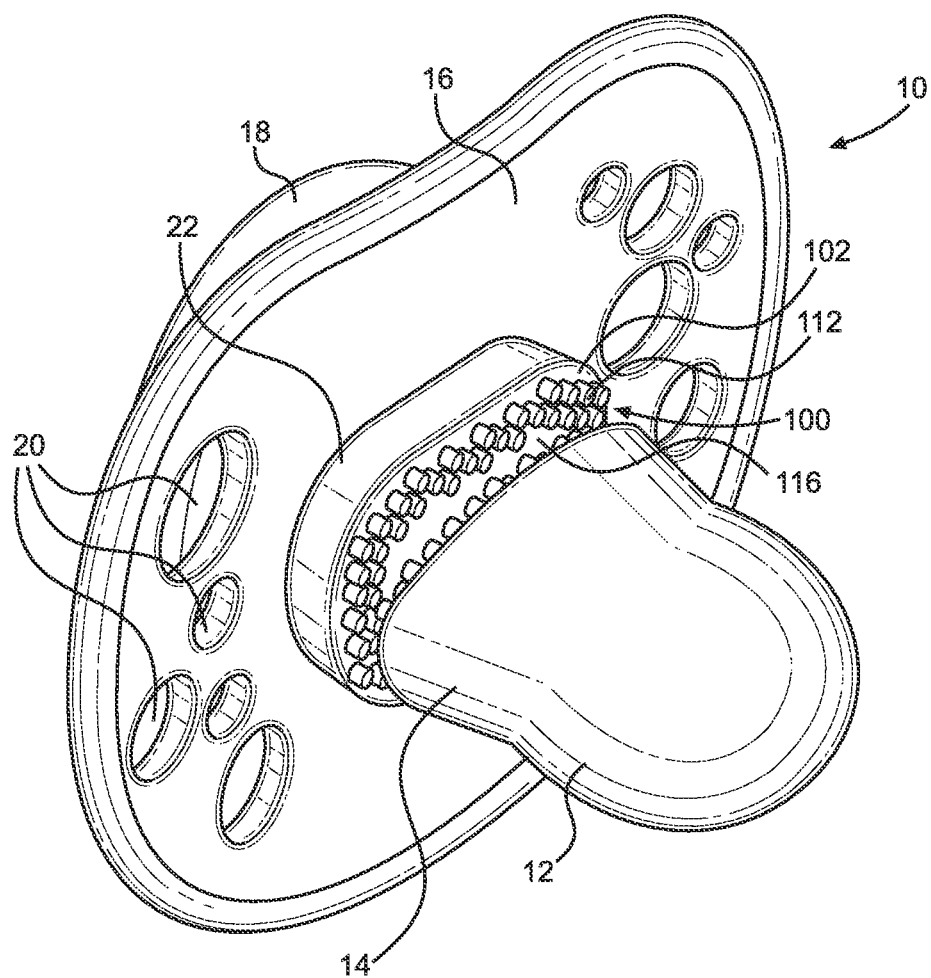
FIG. 1 is perspective view of an embodiment of the present invention.
Figure 2:
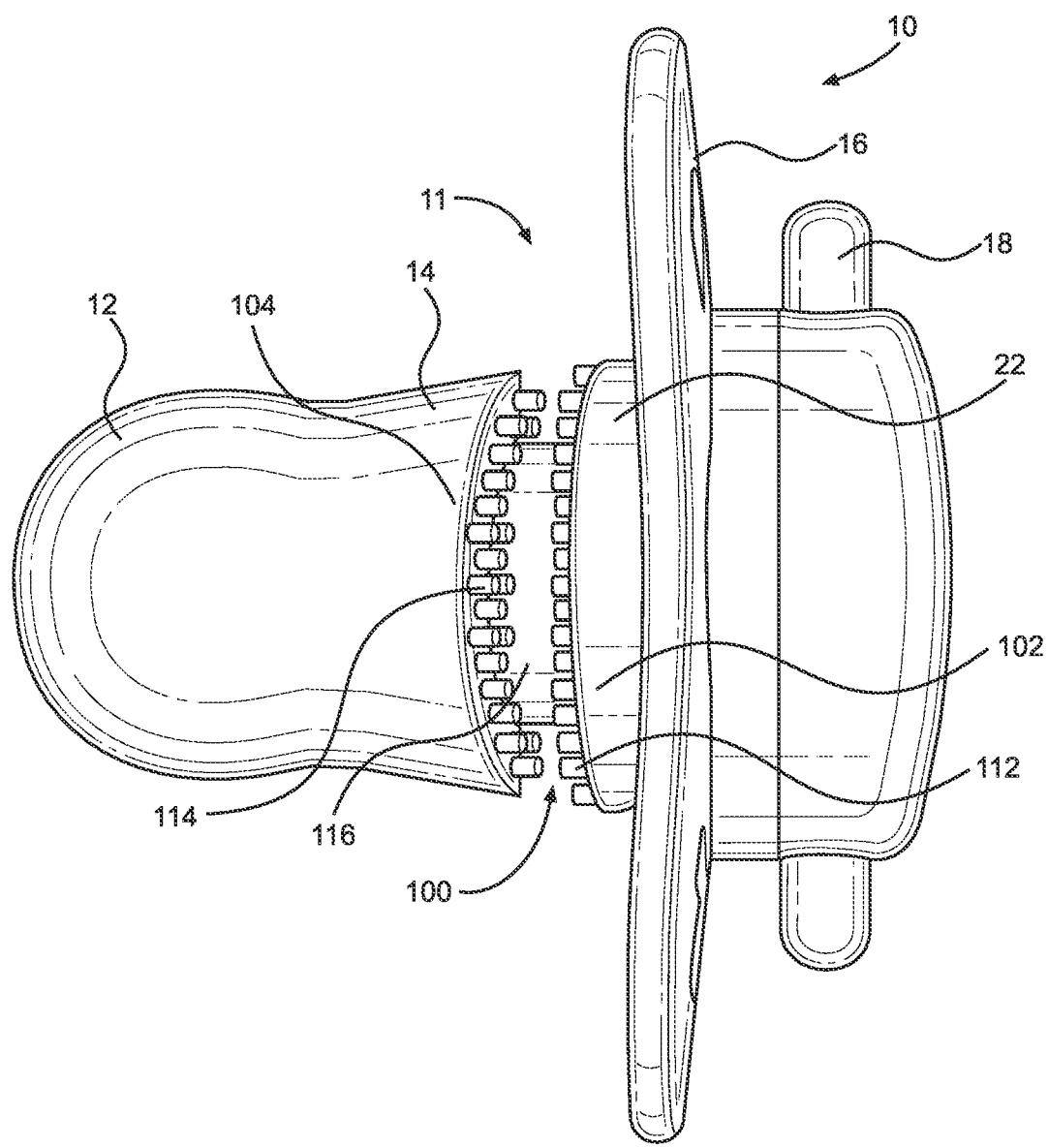
FIG. 2 is a top plan view of the embodiment shown in FIG. 1.
Figure 3:
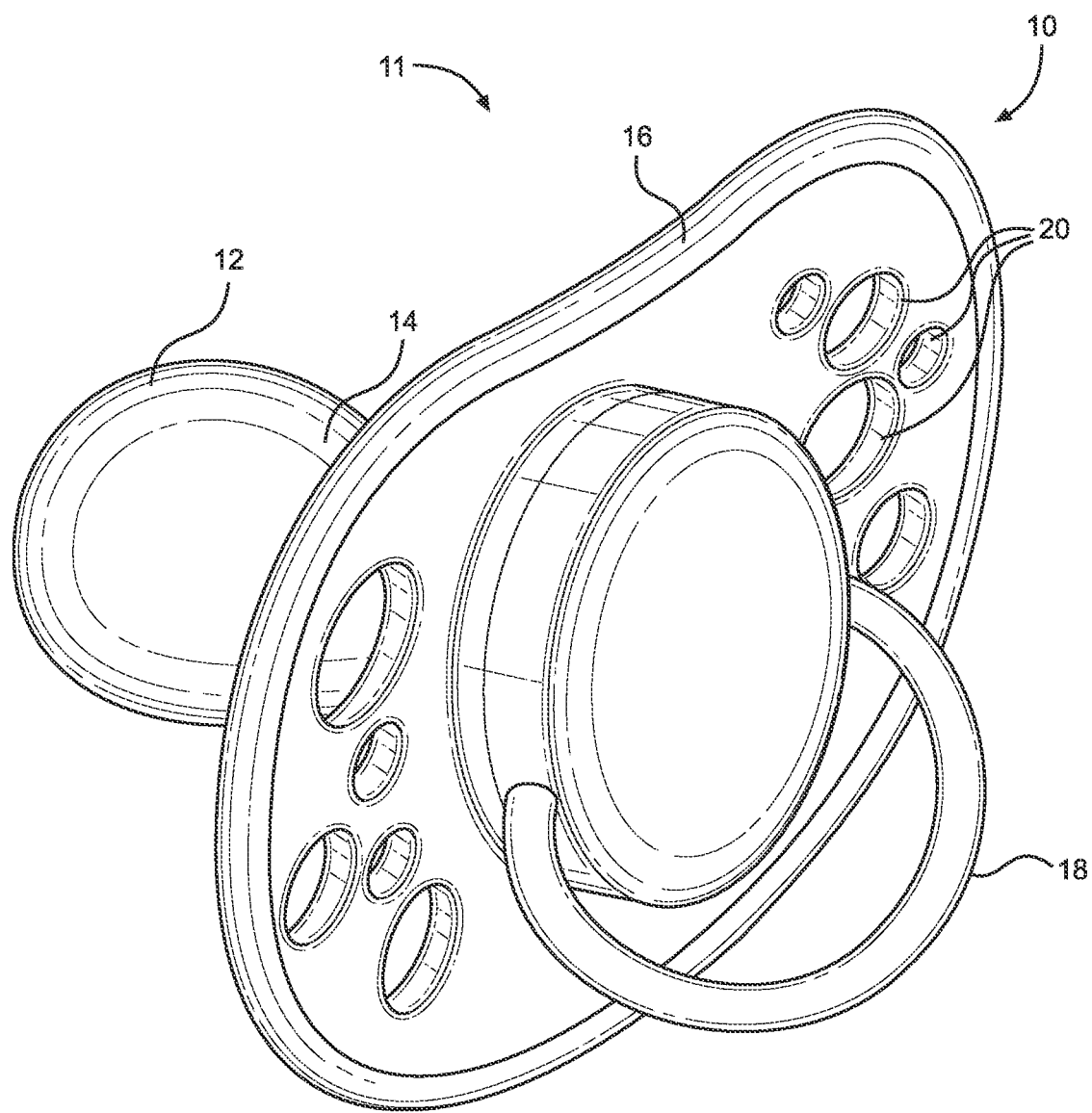
FIG. 3 is a perspective view of the embodiment shown in FIG. 1.

One exemplary embodiment of the present invention is shown in FIGS. 1-3. Turning to FIG. 1, a dual-sided pacifying gum and teeth cleaning device 10 (i.e. "pacifying cleaning device") is shown. The pacifying cleaning device 10 is comprised, generally, of a pacifying stem 11, comprised of an elongated and rounded nipple portion 12 attached to a guard portion 16,
a U-shaped cleansing portion proceeding in a circular manner between the base of the nipple 12 and the lip displacer 22,
and a raised lip displacer 22 located atop the guard portion 16 and located about the base of the nipple portion 12
and a guard handle 18 attached to the guard portion 16 on the other side of the pacifying device 10 in relation to the nipple portion 12.

The nipple portion 12 of the pacifying device 10 is inserted by a caregiver, possibly by the guard handle 18, into the mouth of an infant or young child. Hereinafter, the term "infant" will be understood to mean infant or a young child. As the infant sucks on the pacifying device 10, the infant's mouth is pressed against the lip displacer 22.

Turning to FIGS. 1-2, the protuberance of the lip displacer 22, accompanied by a generally rounded shape, act to gently push the infant's lips apart. The separation of the lips is continued and reinforced by the infant's sucking action on the nipple 12, which also helps pacify the infant.

The cleansing portion 100 is part of the pacifying stem 11, and along it, between the nipple 12 and lip displacer 22, and is further located at or near the base of the nipple 12. The U-shaped cleansing portion 100 has a generally lower profile than either the nipple 12 or lip displacer 22. This results in a generally U-shaped configuration and generally inward orientation of the U-shaped cleansing portion 100 relative to the surface 14 of the nipple 12.

The lower profile of the cleansing portion 100 relative to the nipple 12 and lip displacer result in a generally U-shaped canyon that goes completely (as in this embodiment), or at least partially, around the stem. The U-shaped canyon is comprised of a floor comprised of the surface of the cleansing portion 100, a first wall or shelf 102, is (i.e. "wall") and a second wall or shelf (i.e. "wall") or shelf 104, directly facing the first wall 102, with the two walls separated by the cleansing portion 100. The surface 100 and each respective wall 102, 104 are in a perpendicular position relative to each other. The two walls 102, 104 proceed partially or completely around the stem in a generally circular orientation. A first set of teeth cleaning apparatus 112 is located along the surface of the first wall 102, and a second set of teeth cleaning apparatus 114 is along the second wall 104, such that the respective sets of teeth cleaning apparatus 112, 114 generally face each other. The walls 102, 104 and teeth cleaning apparatus sets 112, 114 are in a generally perpendicular orientation to the surface of the cleansing portion 100. The Cross section of the cleansing portion 100 itself can be any suitable shape such as (in this embodiment) circular, ovoid, rectangular, or other suitable shape.

It is to be understood that the term "teeth cleaning apparatus" 112, 114 herein means any apparatus in the art capable of providing a brushing or mechanical cleaning action to teeth, and can include one or a set of bristles, protuberances, a set of thin shafts, nubs, or a set of rounded surfaces.

In this embodiment, bristles are used as the teeth cleaning apparatus sets 112, 114 and are shown and described.

As the infant continues sucking on the nipple 12 and the infant's lips become separated by the lip displacer 22, the infant's teeth naturally gravitate forward along the nipple 12 towards the cleansing portion 100 located at or near the base of the nipple 12. As the baby's mouth reaches the lip displacer 22 and guard 16, any forward motion will stop, and the baby's teeth will drop onto the cleansing portion 100.

Because of the lip separation of the lip displacer 22, bristles can work their way past the lips and into the infant's mouth, between and adjacent to the infant's teeth and against the infant's gums, or if the infant has no teeth, then simply against the gums. As the baby sucks and moves his/her mouth around, the respective teeth cleaning apparatus sets 112, 114 will frictionally contact against the baby's teeth, thereby helping remove debris or substances from the teeth, providing a cleaning motion and action. The action of the teeth cleaning apparatus sets 102, 104 moving against the teeth and gums, brought about by the sucking motions of the infant, serve to clean the teeth and gums, removing contaminants that can help cause infection. Thereby, the infant's teeth are left much cleaner and free of bacteria than they otherwise would be had they not had contact with the bristle sets 102, 104 helping prevent cavities and infections.

Because the teeth cleaning apparatus sets 112, 114 are at least at the top and bottom of the stem 11, and in this embodiment, all the way around in a generally circular pattern, the upper and lower teeth are both in contact with the bristles. Further, because of the orientation and placement of the bristles, they are in frictional mechanical contact with both the front and back of the infant's teeth. The infant engages the pacifier with upper teeth on the top aspect of the pacifier into the notch formed by the cleansing portion 100 and teeth cleaning apparatus sets 112, 114 and respective walls 102, 104 that hold the bristle sets 102, 104 and the lower (i.e. "bottom") teeth engage the bottom aspect of the pacifier on the other side of the notch relative to the top aspect.

The pacifying device 10 can be any size determined useful for carrying out its is function. In this embodiment, the pacifying device 10 is about 2.0-3.0 inches long, and more particularly, about 2.0-2.5 inches long; the length is understood as extending from the tip of the nipple 12 to the top of the guard handle 18. The pacifying device 10 in this embodiment has a width of about 2.0.-3.0 inches and more particularly, 2.0-2.5 inches; the width is understood as meaning the width of the guard portion 16 at its widest point.

The lip displacer 22 can be any size and orientation suitable for its task: providing sufficient displacement of an infant's lips. In one embodiment, the lip displacer 22 can have a length of about 0.75 to about 2.0 inches and more particularly, a length of about 1.0 inches to about 1.5 inches. It can have a width of about 0.3 inches to about 1.25 inches and more particularly, a width of about 0.5 inches to about 1.0 inches.

The lip displacer 22 can be raised to any suitable height relative to the surface of the guard portion 16 upon which it rests that is suitable for the lip displacer to perform its function, depending on factors such as the size and age of the child and bristle configuration. In this embodiment, the lip displacer 22, can be about ¼ inch to about ½ inch and more particularly, can be about 3/16 of an inch to about ⅜ of an inch.

The lip displacer 22 can be any suitable general surface shape to complete its function, such as, but not limited to, oblong, circular, loosely rounded hourglass or butterfly wing configuration. In one embodiment, the general shape of the lip displacer 22 is a generally oblong shape.

The pacifying cleaning device 10 is comprised of a number of safety features. One feature is the guard handle 18 that serves primarily as a safety feature to enable a caregiver to quickly remove the pacifying device 10 if necessary. The guard handle 18 serves primarily as a handle and though it is in the shape of a ring in this embodiment, can be any suitable shape for carrying out its task, such as, e.g., a T-shaped handle, knob, or simple protruding structure.

Turning specifically to FIGS. 1 and 3, another safety feature of the pacifying device 10 are one or more apertures, represented here in this embodiment as representative aperture sets 20, 20'. The aperture sets 20, 20' are present about the guard 16 and through the guard 16. The aperture sets 20, 20' are each comprised of one or more apertures of suitable size, number, and location about the guard 16, such that an infant can continue to breathe in case the pacifying device 10 somehow becomes stuck or lodged.

Turning to the components of the pacifying device 10, it is to be understood that the pacifying device 10, and the individual parts of the pacifying device 10, can be comprised of any suitable material in the art, including, but not limited to, latex, any suitable type of plastic such as a hard and/or flexible plastic, other resin, silicone, rubber or rubberized material, or any combination of these. The pacifying device 10 can be comprised, other than the teeth cleaning apparatus sets 112, 114, of a single piece construction with the teeth cleaning apparatus sets 112, 114, added by means known in the art.

In this embodiment, the pacifying device 10 is a single-piece construction of latex, rubber, silicone or flexible plastic. The pacifying device 10 can, however, be of a multi-piece construction, with the pieces attached by any acceptable and safe means known in the art. For example, the nipple 12, guard 16, guard handle 18, and lip displacer 22, is or any part of these components, can be fused together during manufacture. The pacifying device 10 is of a suitable size for use, as known in the pacifier art.

In this embodiment, the guard 16 is generally oblong. However, the guard 16 can be any suitable shape that allows it to perform its function of resting against the outside of the infant's mouth and preventing ingestion, such as, e.g., a more rounded shape, a more rectangular shape with rounded corners, or a shape with protrusions, such as a shape resembling a clover or butterfly or heart.

The guard 16 can also be rounded outward, though not shown in this embodiment such that the ends of the guard 16 relative to its base move outward in the direction of the nipple 12, to more easily conform with the contours of an infant's mouth, jaw, and nose.

Returning to FIGS. 1-2, the guard handle 18 is round in this embodiment, but can be any suitable shape, such as a multi-sided configuration, so long as the guard handle 18 is suitable for its primary purpose, aiding in quick removal from the infant's mouth if necessary. The nipple 12 is elongated and generally rounded at its outer end. It can also be of any suitable configuration for its purpose: providing an infant with a protuberance to suck upon.

The teeth cleaning apparatus sets 112, 114 can be made of any suitable material, and of any suitable configuration known in the art for generating an effective cleaning action for infant teeth and/or gums. The teeth cleaning apparatus 112, 114 can be comprised of any suitable material, such as, but not limited to, silicon, rubber, rubberized, nylon, another type of plastic, or other resin material, latex, or any combination of these. In this embodiment, the bristles are comprised of silicon protuberances known in the teeth-cleaning art. The teeth cleaning apparatus 112, 114 can further be comprised of soft or extra soft bristles, as the terms are known and understood in the art, particularly in regard to infant tooth care.

Applicant notes that soft protuberances can also be used and can be especially advantageous in the case of infants with limited or no teeth, wherein the concern is the toughening and cleaning of the gums. In another embodiment the protuberances can be comprised of soft triangular nubs suitable for movement between teeth, or nubs of other suitable size, type, and configuration. The protuberances or nubs herein are soft or extra soft, as these terms are known and understood within the infant tooth and gum care art.

This invention provides a pacifier type delivery system wherein an infant's/toddler's teeth engage the device 10 in a specific area that allows their teeth (both upper and lower) in the space that has the teeth cleaning apparatus sets 112, 114 for targeted cleaning. By this simple method and device, an infant's teeth can be more easily and thoroughly cleaned while simultaneously keeping the infant calm and pacified. Further, multiple surfaces of the teeth, including upper teeth, lower teeth, front and back of the teeth, can be cleaned with little or no extra effort.

This invention provides an easier and more effective way for moms, dads, or other caregivers to help reduce or eliminate cavities, avoid infection secondary to tooth decay, and help prevent Baby Bottle Caries.

It is to be understood that while certain forms of the present invention have been illustrated and described herein, the expression of these individual embodiments is for illustrative purposes and should not be seen as a limitation upon the scope of the invention. It is to be further understood that the invention is not to be limited to the specific forms or arrangements of parts described and shown.

COMPONENT LIST

10 Pacifying Device
11 Pacifier Stem
12 Nipple
14 Surface (Nipple)
16 Guard
18 Guard Handle
20 Aperture Set
22 Lip Displacer
100 Cleansing Portion
102 First Wall/Shelf
104 Second Wall/Shelf
112 Teeth Cleaning Apparatus (First set)
114 Teeth Cleaning Apparatus (Second set)
116 Rounded Floor

The invention claimed is:

1. A dual-sided pacifying gum and teeth cleaning device comprised, generally, of a pacifying stem portion attached to a guard portion,
   wherein the stem portion is comprised of a nipple, a lip displacer, and a U-shaped cleansing portion,
   and wherein the guard portion is comprised of a guard handle attached to the guard portion,
   and wherein the nipple is further comprised of a base, and the U-shaped cleansing portion is located between the base of the nipple and the lip displacer, and
   and wherein the nipple is further comprised of a surface and nipple tip,
   and wherein the nipple surface profile is free of protruding parts between the nipple tip and the U-shaped cleansing portion, and wherein the U-shaped cleansing portion is comprised of a floor in a lower profile position relative to the surface of the nipple, a first wall, and a second wall, wherein the first and second walls are each respectively perpendicular relative to the floor, and directly face each other,
   and wherein the U-shaped cleansing portion is further comprised of a first and second teeth cleaning apparatus on each of the respective first wall and second wall, such that the first and second teeth cleaning apparatus directly face each other, and wherein the lip displacer is situated upon the guard,
   and wherein the guard handle is located on the opposite side of the guard relative to the nipple, the lip displacer, and the U-shaped cleansing portion.

2. The dual-sided pacifying gum and teeth cleaning device according to claim 1, wherein the U-shaped cleansing portion proceeds either completely, or partially, in a circular manner, about the stem portion.

3. The dual-sided pacifying gum and teeth cleaning device according to claim 1, wherein the nipple is elongated relative to the lip displacer and rounded at the end away from the lip displacer.

4. The dual-sided pacifying gum and teeth cleaning device according to claim 1, wherein the first and second teeth cleaning apparatus are each respectively constructed of silicone, rubber, a rubberized material, nylon, a plastic or other resin material, latex, or any combination thereof.

5. The dual-sided pacifying gum and teeth cleaning device according to claim 1, wherein the cross section of the cleansing portion is part circular, part ovoid, rectangular, or square.

6. The dual-sided pacifying gum and teeth cleaning device according to claim 1, wherein the dual-sided pacifying cleaning device is 2.0-3.0 inches long, and 2.0-3.0 inches wide.

7. The dual-sided pacifying gum and teeth cleaning device according to claim 1, wherein the dual-sided pacifying cleaning device is 2.0-2.5 inches long and 2.0-2.5 inches wide.

8. The dual-sided pacifying gum and teeth cleaning device according to claim 1, wherein the lip displacer has a length of 0.75 to about 2.0 inches, a width of 0.3 inches to 1.25 inches, and a raised height of ¼ inch to ½ inch.

9. The dual-sided pacifying gum and teeth cleaning device according to claim 1, wherein the lip displacer has a length of 1.0 inches to 1.5 inches, a width of 0.5 inches to 1.0 inches, and a raised height of 3/16 of an inch to 3/8 of an inch.

10. The dual-sided pacifying gum and teeth cleaning device according to claim 1, wherein the general shape of the lip displacer surface is oblong, circular, a loosely rounded hourglass or butterfly wing configuration.

11. The dual-sided pacifying gum and teeth cleaning device according to claim 1, wherein the guard handle is in the shape of a ring, T-shaped handle, knob, or protruding structure.

12. The dual-sided pacifying gum and teeth cleaning device according to claim 1, wherein the guard is further comprised of at least one aperture set comprised of at least one aperture.

13. The dual-sided pacifying gum and teeth cleaning device according to claim 1, wherein the pacifying device is constructed of latex, a plastic, resin, silicone, rubber, rubberized material, or any combination of these.

14. The dual-sided pacifying gum and teeth cleaning device according to claim 1, wherein the pacifying device is a single piece construction, either including or not including the first and second teeth cleaning apparatus.

15. The dual-sided pacifying gum and teeth cleaning device according to claim 1, wherein the pacifying device is a multi-piece construction.

16. The dual-sided pacifying gum and teeth cleaning device according to claim 1,
wherein the shape of the guard is rounded, rectangular with rounded corners, or a shape with protrusions,
and wherein the shape with protrusions is that generally of a clover, butterfly, or heart.

17. The dual-sided pacifying gum and teeth cleaning device according to claim 1, wherein the guard is further comprised of a base, and rounded outward, such that the outward ends of the guard are more outward toward the nipple relative to the base of the guard.

18. The dual-sided pacifying gum and teeth cleaning device according to claim 1, wherein the first and second teeth cleaning apparatus are each respectively comprised of a set of bristles, nubs, a set of thin shafts, a set of rounded protruding surfaces, or a combination thereof.

19. The dual-sided pacifying gum and teeth cleaning device according to claim 18, wherein the first and second teeth cleaning apparatus are each respectively comprised of either:

a set of bristles, and the bristles are further comprised of silicone, rubber, rubberized, nylon, plastic, or other resin material, and wherein the set of bristles is further comprised of soft or extra soft bristles, or nubs, and wherein the nubs are soft triangular nubs, soft rounded nubs, and wherein the nubs are soft or extra soft.

20. A method of cleaning an infant or toddler's teeth, gums, or both, the method comprising the steps of:

providing a dual-sided pacifying gum and teeth cleaning device comprised, generally, of a pacifying stem portion attached to a guard portion,
wherein the stem portion is comprised of a nipple, a lip displacer, and a U-shaped cleansing portion,
and wherein the guard portion is comprised of a guard handle attached to the guard portion,
and wherein the nipple is further comprised of a base,
and the U-shaped cleansing portion is located between the base of the nipple and the lip displacer, and
and wherein the nipple is further comprised of a surface and nipple tip,
and wherein the nipple surface profile is free of protruding parts between the nipple tip and the U-shaped cleansing portion,
and wherein the U-shaped cleansing portion is comprised of a floor in a lower profile position relative to the surface of the nipple, a first wall, and a second wall, wherein the first and second walls are each respectively perpendicular relative to the floor, and directly face each other,
and wherein the U-shaped cleansing portion is further comprised of a first and second teeth cleaning apparatus on each of the respective first wall and second wall, such that the first and second teeth cleaning apparatus directly face each other, and wherein the lip displacer is situated upon the guard,
and wherein the guard handle is located on the opposite side of the guard relative to the nipple, the lip displacer, and the U-shaped cleansing portion and,
placing the dual-sided pacifying gum and teeth cleaning device in an infant's mouth, in such a manner that the infant's gums or teeth move along the nipple, drop into the U-shaped cleansing portion, and make contact with the first teeth cleaning apparatus, the second teeth cleaning apparatus, or both.

* * * * *